(12) United States Patent
Czaja et al.

(10) Patent No.: US 7,567,536 B2
(45) Date of Patent: Jul. 28, 2009

(54) ACTIVE ACKNOWLEDGMENT SOURCE SELECTION

(75) Inventors: Stanislaw Czaja, Cardiff, CA (US); Feng Qian, Buffalo Grove, IL (US)

(73) Assignee: VIA Telecom Co., Ltd. (KY)

( * ) Notice: Subject to any disclaimer, the term of this patent is extended or adjusted under 35 U.S.C. 154(b) by 634 days.

(21) Appl. No.: 11/202,959

(22) Filed: Aug. 12, 2005

(65) Prior Publication Data

US 2006/0034241 A1 Feb. 16, 2006

Related U.S. Application Data

(60) Provisional application No. 60/601,448, filed on Aug. 12, 2004, provisional application No. 60/610,260, filed on Sep. 15, 2004.

(51) Int. Cl.
*H04W 4/00* (2006.01)

(52) U.S. Cl. .................................................... 370/332

(58) Field of Classification Search ................ 475/215, 475/218, 200, 201, 302, 303; 74/330, 331; 370/342, 335, 331–333, 327–328; 455/442
See application file for complete search history.

(56) References Cited

U.S. PATENT DOCUMENTS

| | | | |
|---|---|---|---|
| 7,006,828 B1 * | 2/2006 | Czaja et al. ................. | 455/442 |
| 7,013,143 B2 * | 3/2006 | Love et al. .................. | 455/450 |
| RE39,177 E * | 7/2006 | Padovani et al. ............. | 455/442 |
| 7,126,928 B2 * | 10/2006 | Tiedemann et al. .......... | 370/329 |
| 7,346,035 B2 * | 3/2008 | Lee et al. .................... | 370/331 |
| 7,349,373 B2 * | 3/2008 | An et al. ..................... | 370/331 |
| 7,352,717 B2 * | 4/2008 | Knisely et al. ............... | 370/329 |
| 2003/0152031 A1 * | 8/2003 | Toskala et al. ............... | 370/236 |
| 2004/0097234 A1 * | 5/2004 | Rajkotia et al. .............. | 455/442 |
| 2004/0258096 A1 * | 12/2004 | Yoon et al. ................... | 370/498 |
| 2005/0068908 A1 | 3/2005 | Qian et al. | |
| 2005/0181811 A1 * | 8/2005 | Magnusson et al. ......... | 455/458 |
| 2005/0181834 A1 * | 8/2005 | Chen et al. ................ | 455/562.1 |

(Continued)

FOREIGN PATENT DOCUMENTS

EP 1392076 A1 2/2004

(Continued)

OTHER PUBLICATIONS

"Active ACK for E-DCH", 3GPP TSG-RAN WG1 Release-6 Adhoc, Prague, Czech Republic, Aug. 16-20, 2004, 2 pages.

(Continued)

*Primary Examiner*—Kwang B Yao
*Assistant Examiner*—Candal Elpenord
(74) *Attorney, Agent, or Firm*—Jaquez & Associates; Martin J. Jaquez, Esq.; William C. Boling, Esq.

(57) ABSTRACT

A wireless communication mobile station (MS or UE) evaluates and categorizes an expected effectiveness of base stations (BSs or Node-Bs) in its Active Set for receiving uplink data, and instructs at least the less effective BSs to suppress some or all acknowledgment signals with respect to particular uplink data packets from the UE. A Target Select message is described for notifying the BSs of their Acknowledgment Target Select category, and a Target Select channel is described for conveying the Target Select message to all Active Set BSs so that they can suppress acknowledgment signaling with respect to corresponding data packets as appropriate for their Acknowledgment Target Select category.

15 Claims, 3 Drawing Sheets

U.S. PATENT DOCUMENTS

2005/0250511 A1* 11/2005 Xiao et al. .................. 455/453

FOREIGN PATENT DOCUMENTS

WO     WO 02/052771 A2     7/2002
WO     WO 2005/015941 A2     2/2005

OTHER PUBLICATIONS

Czaja, et al., "Cell Selection Soft Handoff", 3GPP2/TSG-C50-2000212-008, Feb. 12, 2000, pp. 1-4.

Czaja, et al., "Cell Selection Handoff—Additional Simulation Results", 3GPP2/TSG-C50-20010816-020, Aug. 16, 2001, pp. 1-13.

Czaja, et al., "Cell Selection Handoff for Voice Services", 3GPP2/TSG-C50-20011105-017, Nov. 5, 2001, pp. 1-15.

NEC, "Enhancement of SSDT for Release 5", TSG-RAN Working Group 1 Meeting #19, TSG R1-01-0275, Las Vegas, USA Feb. 27-Mar. 2, 2001.

NEC, "System Level Performance of Parallel Operated SSDT and Tx Antenna Diversity Systems", TSG-RAN Working Group 1 Meeting #6, TSG R1#6(99)911 Espoo, Finland, Jul. 13-16, 1999.

* cited by examiner

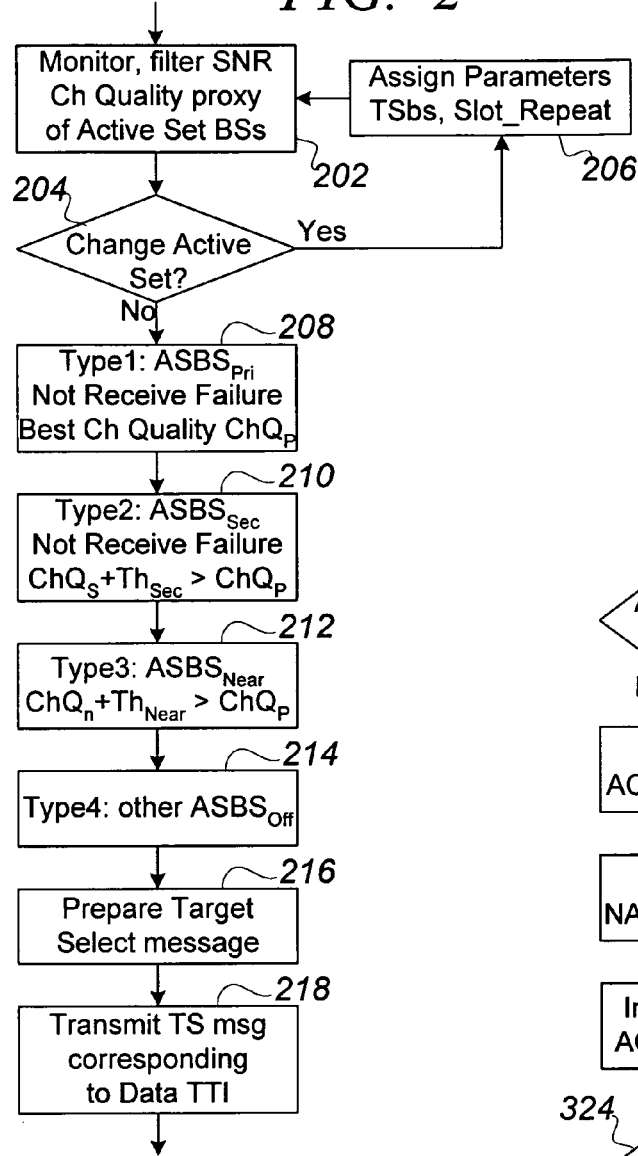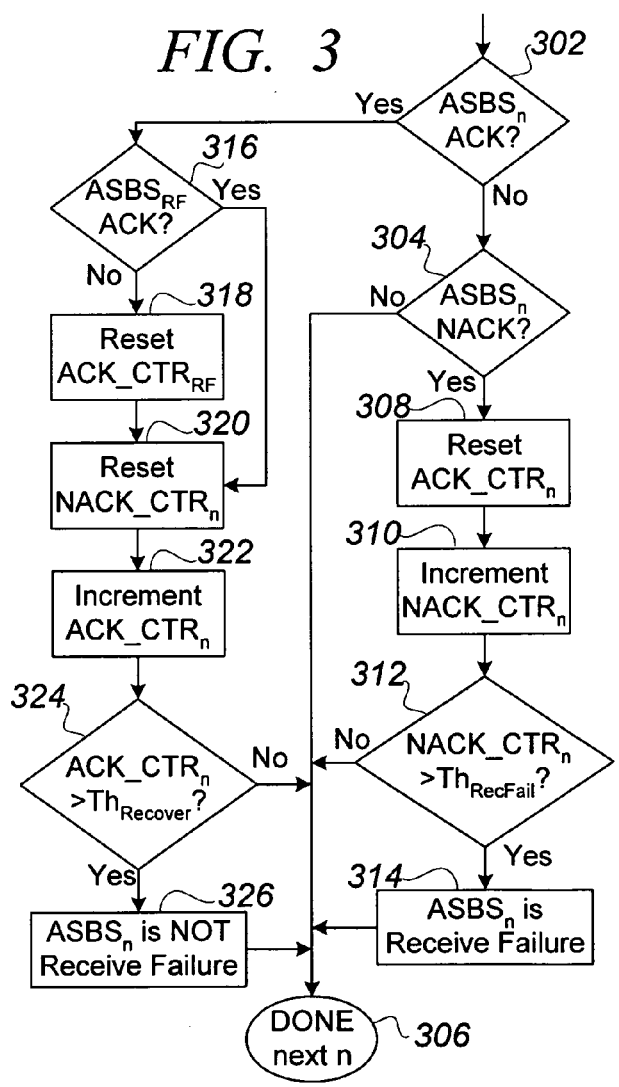

ACTIVE ACKNOWLEDGMENT SOURCE SELECTION

CROSS REFERENCE TO RELATED APPLICATIONS—CLAIMS OF PRIORITY

This application claims priority to U.S. Application 60/601,448 filed 12 Aug. 2004, entitled "Active Acknowledgment Source Selection," and claims priority to U.S. Application 60/610,260 filed 15 Sep. 2004, entitled "Methods and Apparatus Selecting Target Node-B (Base Station) for E-DCH ACK." This application is also related to commonly owned and copending U.S. application Ser. No. 10/947,825 entitled "Tristate Requests for Flexible Packet Retransmission," filed 23 Sep. 2004, which in turn claims priority to U.S. Provisional Application Ser. No. 60/506,343, entitled "Method and Apparatus for Enabling Early Re-Transmission of Sub-Packet 0 in a Wireless Communication System," filed 25 Sep. 2003. All of the above-cited U.S. provisional and utility patent applications are hereby incorporated herein in their entireties by reference.

BACKGROUND

1. Field

This application generally relates to the field of wireless communication systems, and more particularly to signals and protocols that enhance data transmission efficiency in such systems.

2. Related Art

The subject matter set forth herein is applicable to wireless communication systems generally. However, it has been developed primarily in the context of cellular telecommunication systems that provide high-speed connectivity including data and voice transport on both point-to-point and point-to-multipoint bases. First-generation (analog) and second-generation (digital) cellular networks were used primarily for communicating voice traffic via mobile cellular telephones, and thus maintained a focus on access methods for the efficient transport of voice information. With the rising popularity of the Internet, a third-generation (3G) wideband multimedia cellular network continues to be developed to transport both voice and data at much higher speeds than were previously available using the first and second generation wireless networks.

A Third Generation Partnership Project 2 (3GPP2) has been established by industry groups for the purpose of defining specifications to transition current code-division multiple-access (CDMA) wireless networks to the third generation, which is commonly referred to as CDMA2000. One such specification may be referred to as "CDMA2000 1x Revision D" (which may also be referred to as "CDMA2000 1x Rev D," "cdma2000 Release D," "IS-2000-D", or "IS-2000-Rel. D"). The CDMA2000 1x Rev D specification, available from the 3GPP2, is incorporated by reference herein in its entirety for its teachings on communications protocols used in 3G wireless communications systems. The 3GPP2 is primarily concerned with defining specifications for CDMA systems such as are implemented in North America. A document specifying a somewhat different CDMA system, such as is used more commonly in Europe, may be identified as 3GPP TSG-RAN Release-5, and is hereby incorporated by reference for its teachings on CDMA systems. Also incorporated by reference is so much of 3GPP TSG-RAN Release-6 as has been made public, particularly including documents submitted in conjunction therewith and identified as R1-031268, R1-040534, and R1-040758.

As is well known, when a mobile station ("MS," also referred to as User Equipment or "UE") travels between different geographic cells or sectors of base stations ("BSs," also referred to as "Node Bs"), the connection to the UE must be handed over (or handed off) between the different BSs. To this end, the UE may maintain an "active set" or list of BSs, the active set including one or more BSs with which the UE is presently in communication. Soft handoffs ("SHOs") are "make before break" changes in connection from a UE, whereby communication begins with a new BS before communication is terminated with old BSs.

To effect an SHO, it may be desirable for a plurality of BSs, or even all of the BSs in the active set of a UE, to be in concurrent data communication with the UE. However, while this may be desirable to ensure that a new connection is established before an old connection is terminated, this concurrent data communication can lead to excessive transmission power. This is particularly true for signals that convey information uniquely between an MS and one BS of its active set. While such unique signals increase with each additional active set member, their uniqueness precludes any diversity benefit that accrues to the signals that are common to a plurality of active set BSs. Because transmission power on one channel effectively appears as noise on other channels, such excessive transmission power impairs the detection of other signals. Thus, any excess transmission power generally translates to reduced system connection capacity. It is therefore desirable to reduce or minimize unnecessary transmission power.

The use of automatic retransmission protocols that operate within a "physical" communication layer, such as the Hybrid Automatic Retransmission reQuest (H-ARQ) protocols, may enhance the efficiency of wireless data transmissions.

It is well known that Hybrid Automatic Retransmission reQuest (H-ARQ) protocols may provide significant gains when operating packet data channels. However, those gains come at a cost of increased power requirements. When a transmitting station (TS) transmits a packet to a receiving station (RS), H-ARQ procedures generally require the RS to promptly transmit an acknowledgment signal back to the TS in order to indicate whether the packet transmission was successful (ACK) or not (NACK). Such acknowledgment signals are unique between an MS and a particular member of its active set of BSs. Consequently, the power used to transmit such acknowledgment signals reduces downlink (DL) capacity both by consuming available transmitter power capacity, and by appearing as noise that decreases the detectability of other signals. Such additional power requirements for a DL ACK channel with a UE (or MS) in SHO have been analyzed by various authors, leading to the conclusion that excessive power may be required to satisfy the desired detection error probability (1% that ACK is incorrectly interpreted as NACK, and 0.1% that NACK is incorrectly interpreted as ACK) for BSs (or Node-Bs) in an active set. Furthermore, when "legs" of the SHO the SHO legs are significantly imbalanced, the power required for successful acknowledgement by a weaker BS (or Node-B) may exceed the total power available at such a weaker BS (each "leg" is a connection between the MS and one BS, so that there are as many legs as there are BSs in the active set of the MS).

Several techniques may be used to reduce the DL ACK peak power requirements, such as: "transmission scheduling;" a use of "ON/OFF" signaling, taking advantage of the fact that NACK occurs more frequently than ACK in most HARQ systems; etc. However, each such technique has associated disadvantages, with most being inefficient when employed in a system where significant numbers of UEs operate in autonomous mode. Furthermore, none of these techniques mitigate the problem of additional power requirements when plural SHO connections have significant leg imbalances from an MS to different BSs.

The methods and apparatus described herein address the above-described problems, and alleviate other difficulties as well.

SUMMARY

A method and apparatus are disclosed for targeting only certain data receiving transceivers, from among a plurality of possibilities, to actively provide acknowledgment feedback to a data transmitting transceiver, and for suppressing at least some acknowledgment signals from other data receiving transceivers.

According to one embodiment, a method is disclosed that selectively precludes transmission of at least some acknowledgment signals from at least one data packet receiving station (DPRS) that is a member of a set of potential acknowledger DPRSs. The set of potential acknowledger DPRSs are presently configurable to transmit signals to acknowledge data packets received from a particular data packet transmitting station (DPTS). According to one disclosed embodiment, the method selectively precludes transmission of at least some acknowledgment signals from the at least one DPRS while selectively enabling transmission of at least some acknowledgement signals from another DPRS that is also a member of the set of potential acknowledgers. The method includes evaluating an expected effectiveness of acknowledgment signals that may be transmitted from each DPRS member of the set of potential acknowledgers with respect to the data packets received from the particular DPTS. Based, at least in part, upon the results of such effectiveness evaluation, the disclosed method determines one or more DPRS members of the set of potential acknowledgers from which acknowledgment signals are not needed by the particular DPTS. The method further includes providing, implicitly or explicitly, an acknowledgment disablement indication to at least one unneeded DPRS. The acknowledgment disablement indication indicates that transmission of an acknowledgment signal relevant to a data packet transmitted from the particular DPTS should be suppressed by the unneeded DPRS. The method may further include providing two different acknowledgment enablement indications as appropriate in view of the acknowledgment effectiveness evaluation. A first acknowledgment enablement indication directs transmission of some acknowledgments but suppression of negative acknowledgments. A second acknowledgment enablement indication directs transmission of both positive and negative acknowledgments.

The above-noted method may be applied during a soft handoff (SHO) period of the particular DPTS. The set of potential acknowledger DPRSs (PA-DPRSs) may all comprise members of an active set of BSs of a user equipment (UE). The set of potential acknowledger DPRSs may further include BSs that are being considered for inclusion in such an active set, or may include all DPRSs that are currently configured to receive data packets from the particular DPTS. The method may direct suppression of transmission, by an unneeded DPRS, of all acknowledgment signals relevant to the particular DPTS. The method may also direct suppression of only NACKs (negative acknowledgments), and/or may direct permission to transmit only positive acknowledgments (ACKs). The method also may, based upon system conditions, vary the types of acknowledgment signals that are suppressed or permitted.

One or more ACK Target Select messages (TS msgs) may convey acknowledgment signal disablement for at least one unneeded DPRS. The TS msgs may be transmitted in distinct channels to each DPTS, or from the DPTS to all current PA-DPRSs in a single channel, such as a Packet Data Control Channel (PDCCH) or an Acknowledgment Target Select channel (TSCh), transmitted from the DPTS to all of the PA-DPRSs. The PDCCH or TSCh may be code-defined, such as by a length-128 Walsh code. Each TS msg may provide acknowledgment signal disablement status (ACK target status) for all PA-DPRSs, and may further indicate a target BS that may be used to provide GRNT messages that indicate a data rate for data packets transmitted by the DPTS (GRNT target status). The TS msgs may provide exactly one symbol that indicates ACK target status and/or GRNT target status for each possible PA-DPRS, though each symbol may be repeated n times to enhance reliability. Each such symbol comprises exactly one Off/BPSK tristate bit. Each TS msg may be conveyed in a TSCh frame equal in length to a corresponding data packet frame. Frame length of the PDCCH or TSCh may be 10 ms, and may include subframes, which may be 2 ms each. TS msgs may be limited to the first 1-4 of such subframes. TSCh frames may be temporally aligned to a frame of a data packet with respect to which acknowledgment is suppressed, or offset from such data packet frame to arrive at an earlier time. Each different practical combination of the foregoing optional requirements constitutes an alternative embodiment of the method of precluding transmission of at least some acknowledgment signals from at least one data packet receiving station (DPRS) during soft handoffs (SHO).

Another aspect includes transceiving apparatus having at least one functional block configured to perform each method step accomplished by the particular DPRS in any combination described above, each such functional block including hardware and/or software as would be readily understood, by a skilled person, to be suitable for performing such step.

BRIEF DESCRIPTION OF THE DRAWINGS

FIG. 2 is a flowchart of an exemplary method of evaluating and categorizing ASBSs, and more specifically, an exemplary method of distributing ASBSs into four ACK categories or types: Primary, Secondary, Near, and Off.

FIG. 3 is a flowchart of an exemplary method of mitigating the effects of UL/DL imbalance.

DETAILED DESCRIPTION

Terminology

Figure 1:
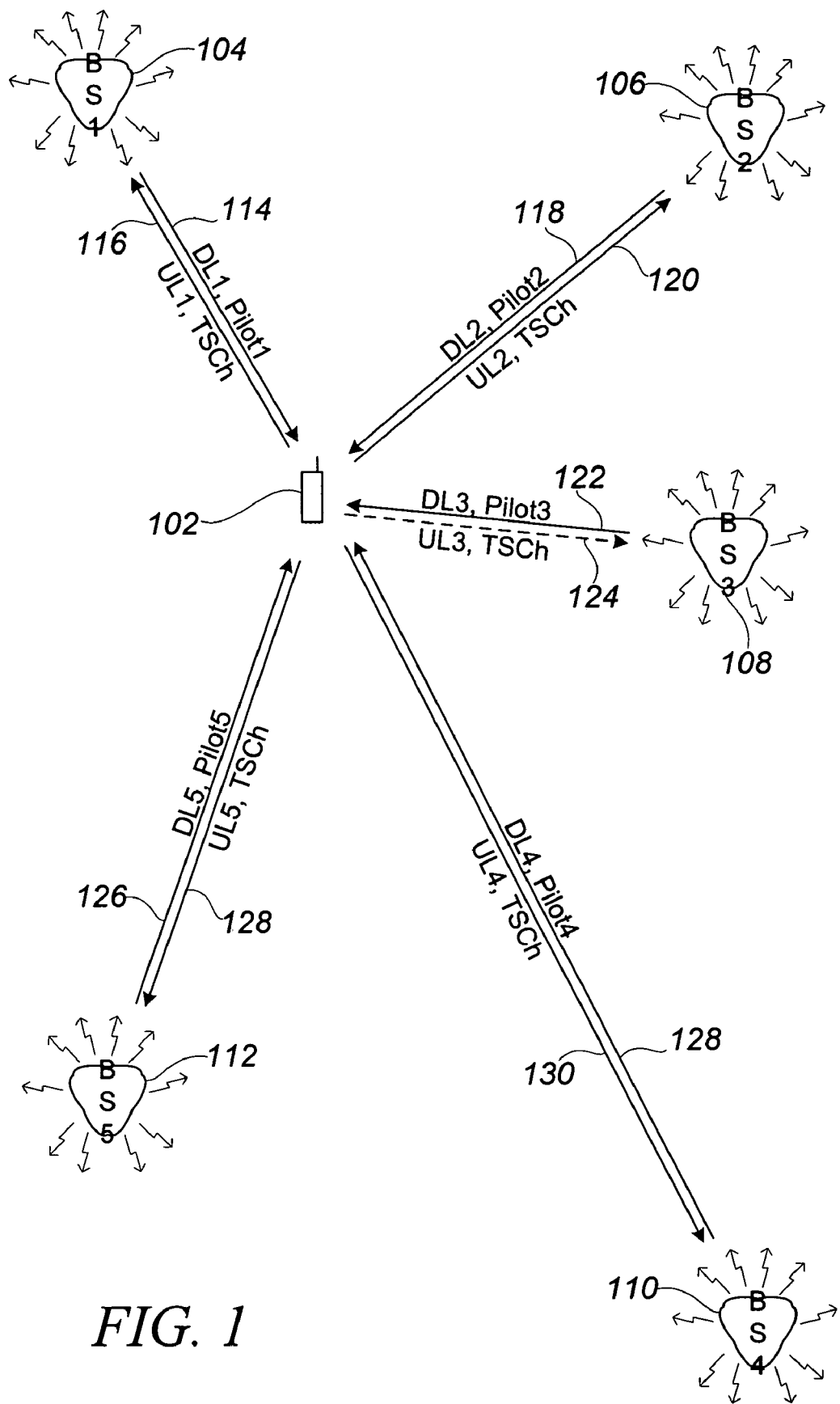
FIG. 1 illustrates communication between a UE and the BSs in its active set, under circumstances in which acknowledgment target selection to restrict acknowledgment signaling may benefit UL (uplink) data communications from the UE to the BSs.

Different CDMA standards, for example the 3GPP vs the 3GPP2 CDMA standards, employ different terms for similar concepts. Because the subject matter herein is applicable to all CDMA regions and both of these different CDMA standards, two terms are frequently employed interchangeably to refer to a common concept. For example, the term UE (user equipment) is used predominantly herein, though it is generally equivalent to a mobile station (MS), while the term base station (BS) is used predominantly, yet is substantially equivalent to "Node-B." In addition to such dual terminology, the Summary section uses self-defined terminology that is employed in neither European nor American CDMA standards documents.

Throughout this patent application, the term "Active Set" is used to refer to a set of all BSs (or Node-Bs) that are recognized by a corresponding UE as receivers of UL transmissions from the UE. The Active Set Base Stations ("ASBSs") referred to herein comprise those BSs that are relevant for purposes of active acknowledgment source selection, and comprise all BSs known to the UE (or MS) to be potential acknowledgers of UL data packets from the UE, and that are subject to instruction to withhold such acknowledgment. Thus, an ASBS, as used herein, is typically equivalent to a PA-DPRS (potential acknowledger—data packet receiving station). The maximum number of ASBSs associated with a particular UE is assumed to be six, though a skilled person will readily adapt the teachings herein for use with active sets of different sizes.

The term signal-to-noise ratio ("SNR") herein literally encompasses any of numerous measurements that reflect signal energy compared to noise energy, such as the commonly used quantities Ec/Io, Eb/Nt, and Ior/Ioc. However, in this document SNR is intended to be construed even more broadly, so as to suggest any quantity, used for assessing channel quality, that is based on a signal strength measurement.

In addition to the acronyms employed in the Summary section and those set forth above, the following additional acronyms are employed: "H-ARQ" standing for hybrid automatic retransmission request; "UL" for uplink (transmission from a UE to one or more BSs); "DL" for downlink (transmission from one or more BSs to a UE); "SHO" for soft handoff or soft handover; "ACK" for positive acknowledgment signals, or sometimes for acknowledgment signals generally; "NACK" for negative acknowledgment signals; "eNACK" for error acknowledgment signals in systems employing tristate ACK signals; "PDCCH" for packet data control channel; "TS" for (particularly acknowledgment) target select; "TSCh" for (acknowledgment) target select channel; "ChQ$_x$" for a quality indication of channel X; "TTI" for transmission time interval, essentially the duration of a frame; "GRNT" for a signal from a receiving BS that grants a data rate for data packet transmissions by a UE; "BPSK" for binary phase shift keying; "DTX" for discontinues transmission, or blank; "MCPS" for mega chips per second; "PDCH" for packet data channel; and "E-DCH" for a UL data channel, substantially equivalent to a "UL-PDCH."

Overview

As noted above, automatic retransmission procedures, such as H-ARQ, are widely used to enhance performance in systems that communicate data in packets. The methods and apparatus described herein were developed in the context of 3G CDMA cellular communication systems, but also may be employed with any communication system in which there are periods during which, under at least some circumstances, data packet acknowledgement signals are transmitted to the data packet transmitting station by a plurality of different stations attempting to receive the transmitted data packets. An exemplary embodiment is described in terms that are typically associated with 3G CDMA systems, but it should be understood that the methods and apparatus may be embodied as well with analogous steps, or analogous structure, that is suitable for different types of communication systems.

During SHO (soft handoff), or during any time that a particular UE (or MS) is in concurrent communication with a plurality of different data packet receiving stations (e.g., BSs or Node-Bs), it may be desirable for each of the various receiving BSs to provide an acknowledgment signal to the UE in order to reflect a success or failure of such BS when attempting to receive a particular data packet. For example, it may be desired to employ full H-ARQ procedures for each receiving BS. Alternatively or additionally, it may be desired to determine at least whether particular BSs have successfully received particular packets.

For the most effective use of H-ARQ processes, it is generally preferred that the detection probability of acknowledgment signals be very high. Substantial power may be required to transmit acknowledgment signals with the desired high detection probability.

When two BSs are both receiving packet data from a particular UE, each has a separate media channel to the UE. There is likely to be a "leg" imbalance in the channel characteristics between any two such media channels. Such a leg imbalance is likely to affect transmissions in both directions (i.e., in both the uplink and downlink directions). The poorer the BS-UE media channel, the higher the gain will likely need be required to transmit acknowledgment signals from the BS to the UE in order to ensure accurate detection. By transmitting at higher power levels, an acknowledging BS with a poor BS-UE channel will generate more "noise" that potentially interferes with nearby receivers, as compared to BSs having better BS-UE media channels. An acknowledging BS may expend a very substantial portion of its transmission power "budget" simply providing acknowledgment signals to a relatively few UEs if the BS-UE channels are weak or poor.

Moreover, acknowledgment signals are specific to the BS that is transmitting them. Accordingly, there is no signal-enhancing "diversity" gain to be realized due to receiving acknowledgment signals from a plurality of BSs. Each ACK signal must be presumed different, and hence must be decoded independently. As such, a UE may realize very little benefit from the acknowledgment efforts of BSs that have relatively poor channels. The impairment of BS channel capacity that results from such acknowledgments does not provide a compensating value to the system.

Note that a BS receiving a data packet on a weak channel is more likely to fail to receive the data packet correctly, and thus is more likely (compared to a BS having a strong channel) to return negative acknowledgments (or "NACKs"). In a properly coordinated system, successful transmission of a UL packet requires, at most, that one BS successfully receive the data. A single positive acknowledgment, or ACK, therefore renders irrelevant all NACKs in respect of the same data packet. For all of these reasons, DL acknowledgment signaling should be carefully restricted to avoid wasting power and generating unnecessary noise without enhancing system performance.

FIG. 1 illustrates communications between a UE 102 and the BSs in its active set, under circumstances in which acknowledgment target selection to restrict acknowledgment signaling may benefit UL (uplink) data communications from the UE to the BSs. UL and DL (downlink) channels are active between the UE 102 and each of five BSs in its active set, with which the UE is concurrently communicating. The Active Set BSs (ASBSs) include BS1 104, BS2 106, BS3 108, BS4 110 and BS5 112. DL transmissions from BS1 104 to the UE 102 are represented by an arrow 114. The DL transmissions include a corresponding pilot signal (Pilot1) that is broadcast by BS1 104 to all receivers, and a number of DL signals, indicated generally as DL1, that are typically only intended for reception by the UE 102. Many of the DL signals comprised in DL1 may be transmitted identically by other of the ASBSs of the UE 102. However, DL1 may include DL signals that convey information unique to the BS from which it is transmitted (BS1 104, in this case), such as a Power Control signal and/or a UL data acknowledgment signal.

UL (uplink) signals from the UE 102 to BS1 104 are represented by an arrow 116. In contrast to the DL transmissions intended only for the UE 102, the UL transmissions to BS1 104, which are indicated as general UL1 plus a Target Select Channel (TSCh, described in more detail below), are typically intended to be received by all of the BSs in the Active Set of UE 102 (here, BS1-BS5). The Active Set BSs (ASBSs) communicate with each other via a separate system interface, such that information received by one ASBS is available to the system, and thus may be conveyed to any of the other ASBSs.

Similarly as with BS1 104, DL transmissions DL2 and Pilot2 from BS2 106 to the UE 102 are represented by an arrow 118, while UL transmissions UL2 and TSCh are represented by an arrow 120. As shown, BS2 is slightly farther from the UE 102. All other things being equal, it is expected that Pilot2 will be received by the UE 102 with a slightly lower signal to noise ratio (SNR) than that of Pilot1. Pilot2 is not gain-adjusted for the UE 102, so an SNR of the pilot signal may be used to estimate a quality of the DL channel between the UE 102 and the BS. In the exemplary system represented, the SNR of Pilot2 is the basis for a general Channel Quality proxy for BS2 ("$ChQ_2$"), though many other bases for $ChQ_2$ are possible. For the illustrated example, $ChQ_2+2.2$ dB $=ChQ_1$ (for BS1 104).

BS3 108 transmits DL3 and Pilot3 to the UE 102, as represented by an arrow 122. BS3 is even closer to the UE 102 than BS1 104, so in the illustrated example $ChQ_3=1.8$ dB$+ChQ_1$. UL signals UL3 and TSCh are represented by an arrow 124, which in this case is dashed to indicated that it is impaired, and thus the UL channel quality is not closely correlated with the DL channel quality indicated by $ChQ_3$ (UL and DL channels are not balanced). High traffic density is one common cause of such a UL/DL imbalance. For example, BS3 108 may be receiving high-speed UL data transmissions from several other UEs (not shown), thereby increasing uplink noise levels. For the illustrated example, the quality of the BS3 UL channel is substantially inferior to the BS1 UL channel, despite the higher Channel Quality proxy $ChQ_3$, resulting in data packet reception failures by BS3. As such, of all five ASBSs, BS1 will be expected to provide the most useful acknowledgment information, which is why the ChQ of each ASBS is noted with respect to $ChQ_3$, rather than $ChQ_1$. Such ordering will be explained in more detail with respect to FIGS. 2 and 3, below.

BS5 112 transmits DL5 and Pilot5 to the UE 102, as represented by an arrow 126 (for the illustrated example, $ChQ_5+4$ dB$=ChQ_1$), and receives UL5 and TSCh from the UE 102 as represented by an arrow 128. An arrow 128 represents DL4 and Pilot4 as transmitted from BS4 110 to the UE (for the illustrated example, $ChQ_4+7$ dB $=ChQ_1$). UL4 and TSCh, from the UE 102 to BS4 110, are represented by an arrow 130.

The UE 102 transmits data frames at a power level that is adaptively adjusted such that a positive acknowledgment (ACK) is most often received from one or another of the ASBSs. In the illustrated example, BS1 and/or BS2 receive the UL data packets correctly 95% of the time. Due to interference (causing UL/DL imbalance), BS3 receives the UL data packets correctly only 30% of the time. BS5 receives the UL packets correctly only 50% of the time, and distant BS4 receives them correctly only 20% of the time, yet BS4 and BS5 transmit acknowledgment signals to the UE at relatively high power to achieve a desired reception accuracy (an example of the "link imbalance" problem described previously). Even the acknowledgment signals from BS3 are not particularly needed because BS1 and/or BS2 receive reliably. Ideally, the UE 102 needs to receive a NACK only when all of the ASBSs fail to receive a particular data packet, and an ACK when any one of the ASBSs accurately receives the packet. All other acknowledgment signals consume limited BS transmit power capacities, and add interfering noise, without providing corresponding benefit. Active acknowledgment source selection can mitigate such inefficiencies.

Selecting Active Acknowledgment Sources

To overcome the inefficiencies notes above, a mechanism should be provided to evaluate which of a plurality of ASBSs are likely to provide the most useful acknowledgment signals. On that basis, the more effective ASBSs may be selected to provide such signals, while acknowledgment signals are suppressed or restricted from other ASBSs to reduce noise and conserve transmit power capacity.

By default, previously, all ASBSs (which were not gated off) transmitted acknowledgment signals in accordance with the success of their reception of UL data packets from a UE. Selection of active acknowledgment sources, also called ACK target source selection, therefore is defined negatively, by the act of deselecting at least some potential acknowledgment sources, i.e., ASBSs that are in bidirectional communication with a UE. More precisely, ACK target selection occurs when at least one ASBS of a UE, instructed based on an expected acknowledgment signal effectiveness (or data packet reception effectiveness), restricts or suspends transmitting acknowledgment signals to the UE while continuing to transmit other information to the UE. Of course, it is possible to simply "gate off" all transmissions to the UE from an ASBS. Gating off, however, would constitute over-inclusive transmission source selection, rather than acknowledgment source selection, and would terminate other useful signaling by the ASBS in question. For durations when acknowledgment signals from particular ASBSs are limited or suspended, the ASBSs thus restricted continue to transmit at least some other signals to the UE. A particular restricted ASBSs may continue to transmit data, or other information that is identically transmitted by other ASBSs to the UE, and/or may transmit unique signals to the UE. One example of a unique signal that may be transmitted from an ACK-restricted ASBS to the UE is a Power Control signal, which uniquely reflects the SNR with which UE transmissions are received by such ASBS. Thus, active acknowledgment source selection may be performed without ever gating off an ASBS; but though gating off an ASBS does not constitute ACK target source selection, it is possible to gate off one ASBS while performing ACK target source selection with respect to a remaining plurality of ASBSs, at least one of which continues to transmit acknowledgment signals, which another is restricted as to acknowledgment transmissions.

Consider ACK target source selection as it may be applied in circumstances as indicated by FIG. 1. Due to having high SNR measurements, BS3 is initially selected as the target ASBS for providing acknowledgment signals in response to UL data packets transmitted by the UE, and BS1 is selected as a secondary ASBS to provide only positive acknowledgments. All others are instructed to use zero power for acknowledgment signals in response to the UL data packets.

However, due to interference, BS3 fails to properly receive several successive UL data packets, and responsively transmits NACKs. BS1, which has no such UL impairment, properly receives most such packets, and accordingly returns a positive ACK. Informed that the system, through BS1, has correctly received such packet, the UE is not led to retransmit the packets. However, the successive NACKs from BS3 cause that ASBS to be recategorized as a Receive Failure to reflect the unknown impairment that caused it to fail reception, even though an apparently less strong ASBS received correctly. Categorization of BS3 as a Receive Failure in turn causes BS1, having the next strongest pilot, to be selected as the primary acknowledgment target, while BS2 is selected as a secondary, positive-only acknowledger (ACK only). BS3 is instructed not to transmit negative acknowledgments, but is permitted to transmit positive acknowledgments when appropriate so that the UE can determine when the impairment of the UL channel to BS3 has been alleviated. Meanwhile, the remaining BSs are all instructed to transmit no acknowledgments to the UE, saving a great deal of power and noise, particularly for the relatively weak BS4. When the interference impairing BS3 subsides, BS3 can be reinstated as a primary acknowledger, permitting acknowledgment transmit power to be reduced even further. And, as the relative strength of the various ASBSs continues to change, the UE will promptly recategorize each of them to maintain efficiency.

Evaluation and Categorization

The Active Set Base Stations ("ASBSs") may be categorized into two, three, four or five different categories. More categories may permit more efficient operation, while fewer categories may simplify evaluation and signaling requirements. Exemplary embodiments employ three categories. However, to illustrate alternative categorization, FIG. 2 illustrates steps for distributing ASBSs into four ACK categories: Primary, Secondary, Near, and Off. Ideally, the categories reflect the expected usefulness of acknowledgment signals from the ASBS in such category. By restricting the types of acknowledgment (and possibly other) signals that may be transmitted by the ASBSs according to their category, the most inefficient acknowledgment signaling can be avoided. Note that an exemplary system is highly dynamic, and has a very low latency period. In such system, the acknowledgment signal status of each ASBS may change as often as a data packet is transmitted by the UE.

One example of restricting signals from an ASBS according to the ACK target category of the ASBS is set forth here for illustration. Acknowledgment signals from a "Primary" ASBS are unrestricted, and the Primary ASBS is further designated to provide GRNT messages (indications of a data rate at which the UE should send its next data packet). A "Secondary" ASBS also is instructed to provide unrestricted acknowledgment signals, but does not provide GRNT signals. A "Near" ASBS has been deemed close enough that, despite having a lower probability of detection than a Primary or Secondary ASBS, it is likely to sometimes receive a packet missed by the Primary and Secondary ASBSs, and therefore may usefully be permitted to provide positive ACKs. A BS with a high $ChQ_n$, which has been designated as "receive failure status" due to experiencing a series of reception failures, may need to "recover" from such status by successfully receiving a series of data packets. The UE needs at least positive ACK signals (for the method of FIG. 3) to determine when such an ASBS has "recovered," and therefore such a Receive Failure ASBS will be instructed identically to a "Near" ASBS, i.e., permitted to provide positive ACKs only. Finally, all other ASBSs are deemed not to provide sufficient value to justify transmission of acknowledgment signals, and are therefore disposed in an Off category. Their acknowledgment signals are entirely disabled to reduce power and noise.

FIG. 2 illustrates one method of evaluating and categorizing ASBSs. The exemplary details, such as thresholds, are subject to substantial variation, and indeed may be varied adaptively. Relevant processing within the UE begins at a block 202. Block 202 includes monitoring one or more SNR (or other signal strength) parameters that reflect DL signal(s) from each $ASBS_n$ to determine a corresponding Channel Quality proxy $ChQ_n$ that represents an estimate of the channel between the UE and the corresponding $ASBS_n$. $ChQ_n$ may, for example, be simply an SNR (e.g., Ec/Io) of the nth BS in the Active Set, but other DL SNR values, alone or in appropriate combination, may be used equivalently. The SNR values should be filtered somewhat, but the −3 dB frequency response of such filtering may be required to exceed twice 1/(data packet TTI). Block 204 directs the processing to an assignment block 206 if the Active Set has changed, as such a change will generally require updating and assigning various parameters.

At a block 208, the $ChQ_n$ values for each $ASBS_n$ that has not been categorized as a Receive Failure (see FIG. 3) are compared to each other. The non-receive failure ASBS having the highest $ChQ_n$ is selected as the primary $ASBS_P$, and its corresponding quality proxy $ChQ_P$ will serve as the basis of comparison for categorizing the other ASBSs. Processing may continue at a block 210 to select one or more secondary ASBSs that are not categorized as Receive Failures, where the associated $ChQ_S$ is within a threshold $Th_{Sec}$ below $ChQ_P$. The threshold $Th_{Sec}$ may be small, for example about 2 dB, so that an ASBS is categorized as Type 2 or Secondary only if it is quite comparable to the primary $ASBS_P$. For such comparable ASBSs, the acknowledgment signals are expected to be useful, and their transmission is not expected to consume excessive power (i.e., they do not suffer from substantial leg imbalance). At the cost of additional complexity, this category may be made adaptive. For example, $Th_{Sec}$ may be varied based on the history of reception success; $Th_{Sec}$ may be decreased from a maximum value (e.g., 3 dB) to zero as the reception success rate rises from (e.g.) 70% to 95%.

Continuing to a block 212, an $ASBS_n$ is categorized as "Near" if its corresponding $ChQ_n$ is not lower than a threshold $Th_{Near}$ below $ChQ_P$. Such an ASBS may be permitted to transmit only ACKs, because it is expected to occasionally receive a data packet from the UE correctly that has been missed by all Primary and Secondary ASBSs. Sufficiently strong ASBS that have been designated as in order to justify transmitting ACKs The basis for inclusion in the Near category may usefully be varied based on reception history. For example, if the success rate of the Primary and/or Secondary ASBSs is sufficiently high (exceeding a threshold of, e.g., 95%), then there is no advantage to receiving further ACKS, and this category may be closed except for an ASBS that is "recovering" from receive failure status.

Following processing in the block 212, all other $ASBS_n$ are disposed in an "Off" category in a block 214, so that they expend no power providing acknowledgment signals that are estimated unlikely to provide little additional value. Thereafter, a Target Select ("TS") message is prepared in a block 216, as set forth in more detail in the description of FIG. 4. The TS message is transmitted to the relevant ASBSs in a block 218. TS information may be provided somewhat slowly (e.g., at about 100 ms intervals), and/or via higher level processing. In that case, a BS that has been instructed by a TS message may continue to follow such instruction until it is superseded by a further message. In such slower cases, a plurality of UL data TTIs (Tx-Tx-intervals, or frames) will likely correspond to such TS message. However, in an exemplary embodiment, TS messages are transmitted at times corresponding to each UL data packet transmitted by the UE. Such TS messages each correspond (implicitly by timing) to a single UL data packet, creating a highly dynamic process. Transmission of TS messages in a dedicated (or nearly dedicated) channel is described with respect to FIG. 5, though any fast, reliable signaling may accomplish the same function.

Receive Failure Status: FIG. 3 illustrates a technique for mitigating the effects of UL/DL imbalance. Identifying an ASBS as having a status of Receive Failure may remove such ASBS from consideration to be the primary serving BS, even if it has a superior DL channel indications (e.g., ChQ value). Such status may be based on the reception history. Once designated as Receive Failure due to failing to properly receive a certain proportion of previous UL data packets, the BS may retain that status until it demonstrates a subsequent history of successful reception.

In FIG. 3, only the $ASBS_n$ that have been authorized to provide acknowledgment signals need be considered. Processing of each such $ASBS_n$ begins in a decision block 302. If a positive ACK was not received for the particular ASBS, then it is tested for reception of a NACK in a decision block 304. If the particular ASBS has sent neither, then processing turns to the next relevant $ASBS_n$ via the block 306. If, however, $ASBS_n$ returned a NACK according to block 304, then corresponding counters are adjusted: at a block 308 $ACK\_CTR_n$ is reset to zero, and $NACK\_CTR_n$ is incremented in a block 310. If $NACK\_CTR_n$, thus incremented, exceeds a reception failure threshold $Th_{RecFail}$, then a decision block 312 directs processing to a block 314, where the particular ASBS is designated a Receive Failure. If not, then the processing turns to consideration of the next relevant $ASBS_n$ at the DONE block 306. $Th_{RecFail}$ may have a value, for example, of 2-6 successive failures, and may be adaptively increased if the system indicates inadequate stability.

If, at the block 302, it is determined that an ACK was received, then at least one ASBS successfully received the corresponding data packet. If the status of an $ASBS_{RF}$ is presently designated Receive Failure, but such ASBS has recovered from the impairment that caused reception failure, then it should also return an ACK. A failure to do so indicates a reception failure. Consequently, a decision block 316 causes the ACK_CTR of the particular $ASBS_{RF}$ to be reset in a block 318 if it failed to return an ACK when another ASBS received the packet successfully. In either event, processing then proceeds to blocks 320 and 322, where $NACK\_CTR_n$ is reset and $ACK\_CTR_n$ is incremented. A block 324 tests whether $ACK\_CTR_n$ indicates that the number of sequential successes exceeds a recovery threshold $Th_{Recover}$. If so, then at a block 326 any designation of Receive Error is removed from the ASBS, and otherwise processing turns to the next relevant $ASBS_n$, if any, at the DONE block 306. $Th_{Recover}$ may have a value, for example, of 2-6 successive successful receptions, and may be adaptively increased in the event of unstable "ping-ponging" of the ASBS status.

FIG. 3 illustrates a test that categorizes an ASBS as a Receive Failure, or not, based on experiencing a sequence of reception failures, or a sequence of reception successes. Small threshold values permit a category of an impaired BS to be changed reasonably rapidly. However, numerous other test procedures are also possible, many of which are more elaborate. In one alternative, Receive Failure designation may result when an ASBS exceeds a threshold number of reception failures ($Th_F$) out of a selected number of preceding data packet transmissions ($N_{DP}$), rather than being based on an uninterrupted sequence of such failures. Recovery from the status may conversely result from successfully receiving a number (reception success threshold $Th_S$) out of $N_{DP}$ data packet transmissions. The threshold values may be made adaptive to provide further protection against erratic reception by an apparently strong ASBS.

The tests illustrated in FIG. 3 serve to adjust the expected acknowledgment signal effectiveness that is initially based on DL channel estimates. If desired, it is possible to employ indications that reflect UL channel SNRs to effect such adjustment, and such UL-SNR-based adjustment may supplement, or even supplant, the history-based adjustment to expected effectiveness that is indicated in FIG. 3. For example, it is possible to adjust the expected effectiveness based upon the Power Control message from a particular ASBS, which reflects the SNR of UL transmissions. Furthermore, a skilled person will readily develop tests analogous to those illustrated in FIG. 3 for a system in which tristate acknowledgment signals (providing information, such as ACK, eNACK, and NACK, which is beyond the binary alternatives of positive and negative acknowledgments) are employed.

Categorization and TS Message Examples: As a first exemplary embodiment, each $ASBS_n$ may be assigned to one of the categories Primary, Secondary or Off. Primary ASBSs provide GRNT messages to the UE, as well as both positive (ACK) and negative (NACK) acknowledgment signaling in response to UL data packets from the UE. Secondary ASBSs transmit only ACKs (when appropriate), and do not transmit NACKs. "Off" category ASBSs provide neither ACKs nor NACKs with respect to data packets from the UE. Using Off/BPSK tristate signaling, one bit for each ASBS indicates the category for such ASBS, thus instructing the ASBS to acknowledge accordingly. A bit value of −1 indicates Primary category; a bit value of +1 indicates Secondary category; and Off indicates Off category. Thus, an ASBS that fails to detect the bit will act as if it had been instructed to suspend acknowledgment signaling.

As a second example, the acknowledgment signals transmitted from the ASBSs to the UE may be tristate signals intended to facilitate an efficient implementation of incremental redundancy techniques. The acknowledgment signals may indicate a positive ACK, a negative NACK (also called an erasure NACK), and an "error" NACK, or eNACK, which indicates that useable information was received but an error was detected. Such an acknowledgment protocol is described in more detail in the above-incorporated U.S. patent application Ser. No. 10/947,825 entitled "Tristate Requests for Flexible Packet Retransmission," filed Sept. 23, 2004. In such a system, Primary category ASBSs are instructed to transmit GRNT messages as well as all three acknowledgment signals, while Secondary ASBSs are instructed to suppress NACKs, and to transmit ACKs and eNACKs as appropriate. Off ASBSs are instructed to suppress all acknowledgment signaling to the UE.

In a third example, tristate bits (Off/BPSK) are conveyed in a TS message to indicate ACK target category for each $ASBS_n$, and the system also employs tristate acknowledgment signaling (ACK, eNACK, and NACK). The permissible acknowledgment transmissions are indicated by the TS message bits as follows: a TS message bit value of +1 indicates that all three acknowledgment signals are permitted. A TS message bit value of −1 indicates that only positive ACK and eNACK signals are allowed (i.e., NACKs are suppressed); while "off" indicates that only eNACKs are allowed.

Additional or different categories are also possible, as suggested by the four categories reflected in FIG. 2. If the system is desired to have a capacity to direct each ASBS to immediately perform one of four different acknowledgment behaviors, then more than one bit will be required to convey such direction. One alternative implementation for signaling one of more than three behavior categories is to instruct the ASBSs in a separate message in regard to GRNT signaling. Alternatively, particularly in the case of a 10 ms data packet TTI, a portion of the category information may be disposed in a separate subframe of a frame conveying a TSCh message. In either event, tristate signaling may continue to indicate three different acknowledgment target conditions for each ASBS, but the TSCh message may omit GRNT target information.

Tristate signaling may be used to indicate ACK target status, independent of GRNT target status, as follows: Primary category ASBSs may provide all acknowledgment signaling. Secondary ASBSs may provide ACKs only (or ACKs and eNACKs if tristate acknowledgment signals are employed). Off ASBSs may suspend all acknowledgment signaling.

The foregoing examples should suffice to guide a skilled person to select categorization procedures and parameters that are appropriate for the particular circumstances of the communication system in which such procedures will be applied.

Notification

Acknowledgment of UL data packets is performed by the receiving ASBS, and thus only the receiving ASBS can suppress such acknowledgment signaling. However, in many embodiments the categorization of the ASBSs is performed by the UE. Each ASBS, in such embodiments, must therefore be notified as to the results of such categorization. Relatively slow notifications may be conveyed via higher-layer processing to some advantage in system configuration flexibility, but the focus herein is on low-latency notification that will enable agile dynamic adaptation to changing channel conditions. For this purpose, one or more acknowledgment target select (ACK TS) messages will be transmitted by the UE to one or more of the ASBSs of the UE.

The ACK TS message transmitted from a subject UE to a particular $ASBS_n$ may comprise a $TS_n$ message that includes notification only as to the TS status of such $ASBS_n$. This may be desirable if, for example, unused signal bandwidth is available in a channel that is transmitted from the UE uniquely to the $ASBS_n$ for other reasons. However, such unused signal bandwidth may not be readily available to each ASBS uniquely. As such, the exemplary embodiments described below employ a TS message that includes TS status for, and is multicast to, all of the ASBSs of the UE.

The ACK TS message may be transmitted only when the target status of at least one of the ASBS needs to be changed. It may additionally be transmitted periodically to refresh the status. The skilled person can readily implement such alternatives, which may have an advantage of lower power consumption by the UE. However, in the exemplary embodiments described below, the TS message is multicast to all ASBSs in coordination with each UL packet transmitted by the UE, thereby providing both agile acknowledgment suppression and an independent indication that the UE has transmitted a data packet.

It may be useful to coordinate an ACK TS message with one or more particular UL data packets, so that each of the ASBSs can transmit or suppress acknowledgment accordingly as to such particular UL data packet(s). Such coordination may be effected by transmitting the ACK TS message concurrently with the particular data packet, though any predetermined temporal offset between the data packet and the TS message can serve the same purpose of implicit relationship. Note that in some systems, particularly when UL data packets are at least sometimes transmitted unaccompanied by a respective TS message, the implicit coordination need not be of one TS message to one data packet. Instead, an ACK TS message may implicitly apply to all UL data packets for a predetermined duration or number of UL packets, or until the next TS message arrives. Thus, coordination may take many forms to imply that a particular TS message applies to a particular UL data packet.

Various suitable signaling mechanisms are possible in the MAC (Media Access Control) layer, and may be selected as available. In the exemplary embodiments below, however, a separate TS Walsh channel ("TSCh") is employed to convey the ACK TS message in a reliable and timely manner.

It may be convenient to indicate not only the ACK target status of each ASBS in the TS message, but also the status of each ASBS in respect of sending GRNT signals. GRNT signals transmitted by a BS indicate a data rate at which a UE is invited to send UL data, and thus effectively grants a UL data slot to the UE. The system may be configured so that grant signals are only transmitted to a particular UE from a single Grant Target BS.

A TS message may provide data for all potential ACK sources (e.g., each of the six BSs permitted in the UE Active Set). To distinguish two categories, one binary bit per ASBS may be employed. Three categories may be distinguished with the same number of bits if tristate Off/BPSK signaling is employed. Four categories require two bits, and five or six categories may be distinguished using two tristate bits.

Figure 4:
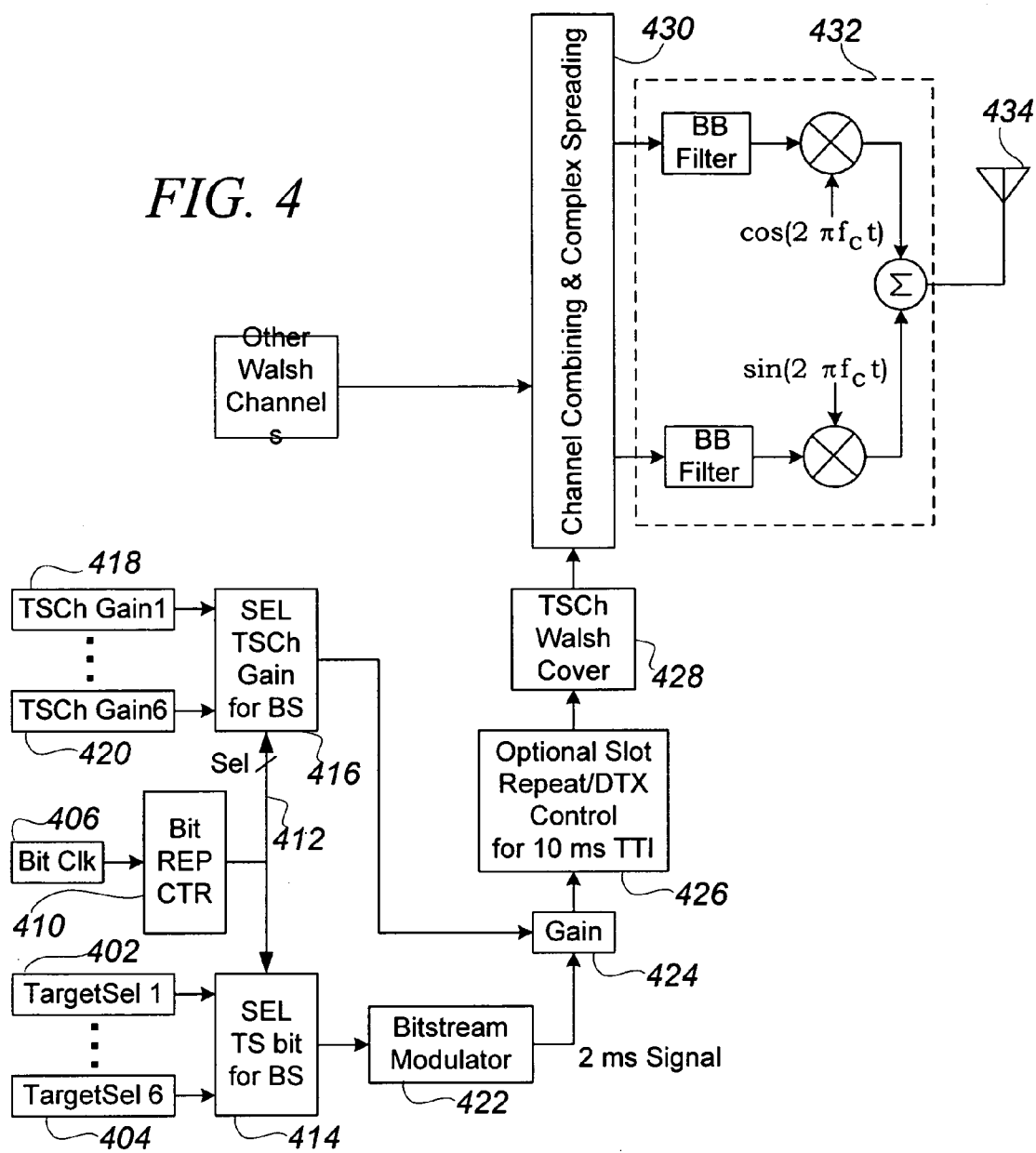
FIG. 4 illustrates features of an exemplary transmitter in a UE that are relevant to transmitting a TS channel (TSCh) that, in some exemplary embodiments, conveys a TS message with multiple redundancy.

A TS channel (TSCh), in some exemplary embodiments, conveys a TS message with multiple redundancy. FIG. 4 illustrates features of an exemplary transmitter in a UE that are relevant to transmitting such a TSCh. Six bits of TS information, TargetSel 1-TargetSel 6 correspond to the maximum number of potential acknowledgers (e.g., the maximum Active Set), as represented by blocks 402-404 (intermediate blocks are not shown). A Bit Clock 406, operating at the system chip rate (e.g., 3.84 Mchips/s) divided by the length of the Walsh code applied in Walsh cover block 408 (e.g., length 128), controls a bit repetition counter 410. The bit repetition counter 410 produces a bit select output that is provided to a data selector 414 and, optionally, to a corresponding gain selector 416. Gains corresponding to the six permitted ASBSs (Active Set BSs) may be provided as represented by blocks 418-420, and the appropriate gain for the current BS (to which the selected TargetSel bit is directed) may be selected by the gain selector 416.

In some exemplary embodiments, the bits are repeated 10 times each. In such embodiments that do not employ the optional gain control for each bit, an advantage in time diversity may accrue if the bit repetition counter 410 increments the select output 412 for every bit clock cycle, interleaving the bits. However, to provide gain control separately for each bit (and thus for the corresponding BS), it may be more convenient for the repetition counter 410 to repeat each bit 10 times before shifting to the next bit, so that the same gain may be applied to 10 sequential bits before changing to a different gain associated with a different BS.

Irrespective of the bit repetition order, the bitstream from the TS bit selector 414 is modulated in a modulator block 422. If desired, the appropriate gain may be applied to the modulated signal, under control of the gain selector 416, in a gain block 424. In the embodiments of this example, the signal at this point is 2 ms in duration (128 chips*60 bits/3.84 MCPS). If the TTI of the corresponding UL data packet is not 2 ms in duration, then an optional Slot Repeat/DTX Control block 426 may usefully create a frame having a duration that matches the UL data packet TTI, as discussed below with respect to FIG. 5. The signal from the Repeat/DTX control 426 is Walsh covered in a block 428, whereupon it is combined with other Walsh channels in a channel combining and complex spreading block 430. The combined and spread channels from the block 412 will be baseband filtered and complex modulated to carrier center frequency in a transmission control block 432, and the sum of such signals will be applied to an antenna 434 (transmission details such as power amplification are not shown).

Figure 5:
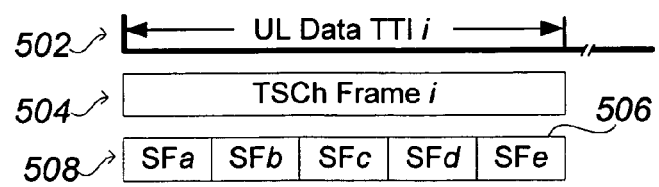
FIG. 5 illustrates data framing for a TS channel (TSCh) for both the 10 ms and the 2 ms examples.

UL data packets in existing or proposed CDMA systems may be organized into frames or "TTIs" (transmission time intervals) having a duration of 10 ms or 2 ms. FIG. 5 illustrates data framing for the TS channel (TSCh) for both the 10 ms and the 2 ms case. Item 502 is a timeline of an ith UL data frame having duration TTI(i). A corresponding ith TSCh frame, represented by block 504, may be temporally coextensive with the UL data frame for ease of determining correspondence (though, of course, any predetermined time relationship will also adequately serve). If the UL data frame TTI is 2 ms, then the slot repeat/DTX block 426 in FIG. 4 may be omitted. However, if the UL data frame TTI instead has a duration of 10 ms, then it will be useful to extend the 2 ms signal provided to the optional slot repeat/DTX block 426 of FIG. 4.

If the UL data packet TTI(i) is 10 ms, then the TSCh Frame(i) may also have a duration of 10 ms. For compatibility with 2 ms signals generated as illustrated in FIG. 4, the TSCh frame may be divided into five 2 ms subframes 506 to generate a time-multiplexed TSCh Frame 508 consisting of five subframes SFa-SFe. The optional slot repeat/DTX control block 426 may be configured in a variety of ways to produce the 10 ms frame 508. A few examples illustrate the concepts. First, each of the five subframes may comprise repetitions of the 2 ms signal provided to the control block 426. Alternatively, detection may be completed more quickly, and the combining process in the receiving BS may be simplified, by disposing DTX (discontinues transmission) in the fifth subframe SFe. If detection probability is sufficient with less repetitions, then the BS processing to combine the subframes may be further simplified by further disposing DTX in any combination of other subframes, such as SFb and SFd. The control block 426 may also be configured to insert unrelated data or signaling information, rather than DTX, in some subframes, particularly if just one or two repetitions of the 2 ms TS message is sufficient for adequate detection performance.

Target Select message Timeliness Considerations: It is desirable for each ASBS to be able to detect and decode the category assignment notification before a need to send an acknowledgment signal with respect to a particular received data packet. Several techniques may facilitate such early detection. First, if the data frame is 10 ms in duration, the acknowledgment category notification (or TS message) may be provided prior to the last 2 ms of such packet data frame. This may be effected, for example, as set forth above, wherein the TS message is not conveyed in the last 2 ms subframe of the frame conveying the TS message. Alternatively, early detection may be effected by disposing the TS message in a frame of a channel (e.g., a TSCh or PDCCH). In this embodiment, the TS message frame has a duration matched to the UL packet data TTI, but is aligned with a time offset with respect to the data packet frame, such that the TS message frame begins and ends 2 ms (or other period) earlier than the data packet TTI.

The PDCCH or TSCh may, for example, be partly or wholly dedicated to providing ACK feedback information (e.g., ACK target select information). In some exemplary embodiments, such channel is defined by a length-128 Walsh (or other orthogonal) code, and has a chip rate that provides 60 symbols per 2 ms subframe of a 10 ms PDCCH TTI. In these embodiments, two or three categories for each of six active set members are indicated with binary or tristate signaling in six symbols. For high detection accuracy, the six bits are repeated from one to ten times in one or more of the first four subframes. Thus, for these embodiments the ACK feedback information may be repeated from two to 60 times. UL data packets having TTIs of 2 ms or 10 ms can be readily accommodated by the proposed channel and TS message structures. The skilled person will also understand that Walsh (or other OVSF) codes of different length may be employed. In addition, the skilled person will understand that different numbers of bits and bit repetitions per TS message, and different frame or subframe durations may be employed as advisable in view of engineering considerations. ACK feedback (or target) information may also be transmitted within a more general-purpose PDCCH.

Conclusion

The foregoing description illustrates exemplary implementations, and novel features, of a method, apparatus, or system that actively selects one or more sources for acknowledgment signals in respect of UL data packets, from among a plurality of transceivers (such as ASBSs) that receive data packets from a data packet transmitter (such as a UE). Although various alternative implementations are suggested, it is impractical to list all such alternatives. As such, the scope of the presented invention should be determined only by reference to the appended claims, and should not be limited by features illustrated in the foregoing description except insofar as such limitation is recited in an appended claim.

While the above description has pointed out novel features of the invention as applied to various embodiments, the skilled person will understand that various omissions, substitutions, and changes in the form and details of the methods and systems illustrated may be made without departing from the scope of the invention.

Each practical and novel combination of the elements described hereinabove, and each practical combination of equivalents to such elements, is contemplated as an embodiment of the invention. Because many more element combinations are contemplated as embodiments of the invention than can reasonably be enumerated explicitly herein, the scope of the invention may properly be defined only by the appended claims, rather than by the foregoing description. All variations coming within the meaning and range of equivalency of the various claim elements are embraced within the scope of the corresponding claim. Each claim set forth below is intended to encompass any system or method that differs only insubstantially from the literal language of such claim, as long as such system or method is not, in fact, an embodiment of the prior art. To this end, each described element in each claim should be construed as broadly as possible, and moreover should be understood to encompass any equivalent to such element, insofar as possible without also encompassing the prior art.

The invention claimed is:

1. A method of restricting acknowledgment signals transmitted from a plurality of base stations (BSs), which are active set BSs (ASBSs) of a user equipment entity (UE) in a wireless communication system, to the UE in response to uplink (UL) data packets transmitted from the UE to the ASBSs, comprising acts by the UE of:
   (a) monitoring channel conditions between the UE and each of the ASBSs;

(b) evaluating an expected effectiveness of acknowledgment signaling from each of the ASBSs to the UE;

(c) selecting, based on step (a), an ACK target status category for each of the ASBSs, including (i) selecting an "Off" ACK target status category for at least one ASBS from which acknowledgment signals to the UE should be temporarily suspended while transmission of at least one other signal to the UE is continued, and (ii) selecting a plurality of "On" ACK target status categories for a corresponding plurality of other ASBSs from which allowable acknowledgment signals corresponding to data packet reception success should be transmitted to the UE, including selecting an unrestricted "On" category for at least one ASBS wherein all acknowledgment signals recognized by the UE are deemed allowable for transmission from such ASBS to the UE, and selecting a restricted "On" category for at least one other ASBS wherein only a reduced subset of such recognized acknowledgment signals are deemed allowable for transmission to the UE by such other ASBS; and (d) transmitting one or more ACK Target Messages to the ASBSs that provide information sufficient for each ASBS to determine its ACK Target status category for purposes of responding to a corresponding data packet transmission from the UE to such ASBS.

2. The method of claim 1, further comprising transmitting the one or more ACK Target Message updates with a latency sufficiently low to permit each ASBS to transmit or suspend, according to the ACK Target status category indicated by the ACK target message, an acknowledgment signal reflecting reception success with respect to a corresponding data packet transmitted from the UE within about 20 ms of transmission of the ACK Target Message.

3. The method of claim 2, further comprising transmitting the ACK Target Message in a frame substantially concurrently with the corresponding data packet.

4. The method of claim 1, further comprising conveying the ACK Target Message for all of the ASBSs within a single uplink (UL) data packet transmission time interval (TT1) via a single CDMA channel.

5. The method of claim 1, further comprising transmitting the ACK Target Message using tristate bits.

6. The method of claim 1, further comprising incorporating both ACK Target status category and uplink data grant target status for all ASBSs within the ACK Target Message.

7. The method of claim 1, further comprising adjusting an estimate of expected effectiveness of acknowledgment signaling for a particular BS of the Active Set based upon a recent history of data reception failures by the particular BS.

8. The method of claim 1, further comprising increasing an estimate of expected effectiveness of acknowledgment signaling for an ASBS based upon an increase in a filtered value that reflects one or more signal-to-noise ratios between the UE and such ASBS.

9. The method of claim 8, further comprising representing both ACK target status category and uplink data grant target status together as a single tristate bit for each ASBS within the ACK Target Message; transmitting the ACK Target Message tristate bits for all of the ASBSs multiply redundantly within a frame of a single CDMA channel substantially concurrently with a transmission time interval (TTI) of an uplink (UL) data packet to which the ACK Target Message is intended to apply.

10. A method of operating a BS in a wireless communication system in coordination with at least one UE that performs in accordance with the method of claim 9 including performing, while the BS is an ASBS of the UE, steps of:

(a) receiving a first ACK Target Message from the UE indicating that the BS is in an ACK Target status category of "Off" with respect to at least a first data packet transmission from the UE, and accordingly transmitting no acknowledgment signal to the UE in respect of the first data packet transmission; and (b) receiving a second ACK Target Message from the UE indicating that the BS is in an ACK Target status category of "On" with respect to at least a different second data packet transmission from the UE, and accordingly transmitting an allowed acknowledgment signal to the UE reflecting reception success or failure with respect to the second data packet transmission.

11. A method of operating a BS in a wireless communication system in coordination with at least one UE that performs in accordance with the method of claim 1 including performing, while the BS is an ASBS of the UE, steps of:

(a) receiving a first ACK Target Message from the UE indicating that the BS is in an ACK Target status category of "Off" with respect to at least a first data packet transmission from the UE, and accordingly transmitting no acknowledgment signal to the UE in respect of the first data packet transmission; and (b) receiving a second ACK Target Message from the UE indicating that the BS is in an ACK Target status category of "On" with respect to at least a different second data packet transmission from the UE, and accordingly transmitting an allowed acknowledgment signal to the UE reflecting reception success or failure with respect to the second data packet transmission.

12. User Equipment apparatus (UE) configured to communicate bidirectionally with a plurality of BSs comprised in an Active Set of BSs for the UE by receiving downlink (DL) transmissions from and transmitting uplink (UL) data signals to a plurality of such Active Set BSs (ASBSs) in a wireless communication system, comprising:

(a) a channel monitoring module configured to monitor channel conditions to each ASBS;

(b) an acknowledgment signal reception module configured to receive acknowledgment signals that reflect success or failure of ASBSs to correctly receive corresponding data packets transmitted from the UE;

(c) an acknowledgment source evaluation module configured to predict a suitability of acknowledgment signals to the UE from each of the ASBSs;

(d) an ACK Target category assignment module configured to categorize two different ASBSs in two ACK Target categories, members of which are intended to send appropriate allowable acknowledgment signals reflecting reception success or failure for corresponding data packets transmitted by the UE, including one ASBS in an unrestricted ACK Target category for which allowable acknowledgment signals are an unrestricted set of system acknowledgment signals, and a second ASBS in a restricted ACK Target category for which allowable acknowledgment signals do not include negative acknowledgments, and to categorize at least one different ASBS as not an ACK Target ASBS that is intended to suspend transmission of acknowledgment signals to the UE in respect of corresponding data packets transmitted by the UE;

(e) a Target Select message preparation module configured to prepare one or more messages including information sufficient to indicate any changes in ACK Target status for all of the ASBSs; and (f) a transmission module configured to transmit the one or more Target Select messages to the ASBSs at an appropriate time to direct each of the ASBSs whether or not to suspend acknowledgment transmissions with respect to a particular data packet transmitted from the UE to the ASBSs.

13. The UE apparatus of claim 12, wherein the transmission module (f) is further configured to transmit the Target Select messages as one tristate Off/BPSK bit for each ASBS allowed by the communication system, each tristate bit repeated a multiplicity of times.

14. The UE apparatus of claim 12, wherein the transmission module (f) is configured to transmit each Target Select message substantially concurrently with a data packet to which the Target Select message corresponds.

15. A method of restricting acknowledgment signals transmitted from a plurality of base stations (BSs), which are active set BSs (ASBSs) of a user equipment entity (UE) in a wireless communication system, to the UE in response to uplink (UL) data packets transmitted from the UE to the ASBSs, comprising:

(a) a step for monitoring channel conditions between the UE and each of the ASBSs;

(b) a step for evaluating an expected effectiveness of acknowledgment signaling from each of the ASBSs to the UE;

(c) a step for selecting, based on step (a), an ACK target status category for each of the ASBSs, including substeps of
   (i) selecting an "Off" ACK target status category for at least one ASBS from which acknowledgment signals to the UE should be temporarily suspended while transmission of at least one other signal to the UE is continued, and
   (ii) selecting a plurality of "On" ACK target status categories for a corresponding plurality of different ASBSs from which allowable acknowledgment signals corresponding to data packet reception success should be transmitted to the UE, including a first unrestricted ACK target status category for an ASBS for which allowable acknowledgment signals are an unrestricted set of system acknowledgment signals, and a restricted ACK target status category for which allowable acknowledgment signals do not include negative acknowledgments; and (d) a step for transmitting one or more ACK Target Messages to the ASBSs that provide information sufficient for each ASBS to determine its ACK Target status category for purposes of responding to a corresponding data packet transmission from the UE to such ASBS.

* * * * *